Aug. 5, 1952 A. G. McNEIL 2,605,930
LIQUID DISPENSING APPARATUS HAVING RATE OF
CLOSING CONTROL FOR THE FLOW CONTROL VALVE
Filed April 25, 1950 4 Sheets-Sheet 1

FIG_1

INVENTOR.
ALVIN GORDON McNEIL

BY

Mellin and Hanson
ATTORNEYS

FIG_2

FIG_3

INVENTOR.
ALVIN GORDON McNEIL

FIG_4

FIG_5

FIG_6

INVENTOR.
ALVIN GORDON McNEIL

BY

Mellin and Hanscom
ATTORNEYS

Aug. 5, 1952     A. G. McNEIL     2,605,930
LIQUID DISPENSING APPARATUS HAVING RATE OF
CLOSING CONTROL FOR THE FLOW CONTROL VALVE
Filed April 25, 1950     4 Sheets-Sheet 4

FIG_7

FIG_8

FIG_9

FIG_10

FIG_12

FIG_11

INVENTOR.
ALVIN GORDON McNEIL

BY

*Mellin and Hanscom*

ATTORNEYS

Patented Aug. 5, 1952

2,605,930

UNITED STATES PATENT OFFICE 2,605,930

LIQUID DISPENSING APPARATUS HAVING RATE OF CLOSING CONTROL FOR THE FLOW CONTROL VALVE

Alvin Gordon McNeil, Oakland, Calif., assignor to Ralph N. Brodie Company, Oakland, Calif., a corporation of California Application April 25, 1950, Serial No. 158,009

12 Claims. (Cl. 222—20)

This invention relates to flow control systems and apparatus therefor and is particularly concerned with a metering flow control system and apparatus as commonly used in dispensing hydrocarbon fuels, such as gasoline and the like.

In the metered dispensing of fluids of the character referred to, it is common to employ a metering device which may control the dispensing valve in such manner as to predetermine the amount of fluid to be dispensed. In the use of such devices and particularly where the discharge pipes are large and the flow of fluid is rapid as in the dispensing of large quantities, such as in the loading of tank cars and trucks, the sudden termination of the fluid flow frequently causes shock and injury throughout the pipe line and in the associated apparatus. This is particularly true with respect to the metering device itself which frequently is such as to be delicate and easily injured by such shock. Such sudden termination of the rapid flow may also result in an inaccuracy in the metering due to the shock referred to and to surging of the fluid.

It is therefore among the primary objects of the present invention to provide a fluid flow system by which the fluid flow may be automatically controlled and terminated without subjecting the apparatus to the shock of a sudden termination of the flow.

It is a further object of the present invention to provide a novel and improved fluid flow system and apparatus therefor by which a metered control of the fluid flow may be obtained in such manner as to provide a preliminary reduction in the rate of flow prior to the final termination thereof.

A further object of the present invention is to provide a fluid flow system and an apparatus therefor by which a fluid flow meter may be arranged to automatically terminate the flow of fluid after passage of a predetermined volume of fluid through the meter and by which the flow may be gradually diminished without subjecting the meter and the attendant pipe lines to the shock of sudden complete cessation of the flow.

A further object of the present invention is to provide a metering system and apparatus by which a main control valve for the flow of fluid to or from the meter may be actuated by means of a pilot valve under the control of the counter of the meter and by which the main flow valve may be closed by successive steps so as to gradually diminish the flow of fluid.

A further object of the present invention is to provide a fluid flow system and apparatus therefor by means of which a metered amount of fluid may be discharged at a high rate of flow and whereby after the passage of a predetermined amount of liquid at such high rate of flow the valve is partially closed to permit a subsequent lower rate of flow of a further predetermined amount of said fluid.

Another object of the present invention is to provide a meter control fluid flow system including a diaphragm valve together with means by which the valve may be pressure controlled to selectively permit full unrestricted flow of fluid and a subsequent reduction of the rate of flow together with a final termination of the fluid after such reduction.

A further object of the present invention is to provide a novel and improved pilot valve control system and apparatus for the control of a main flow valve in response to the rotation of a meter counter.

Numerous other objects and features of the present invention will be apparent from the consideration of the following specification taken in conjunction with the accompanying drawings in which.

In general the invention may be defined as comprising a meter and a flow valve which is controlled thereby through the medium of a pilot valve, which in turn is controlled by the counter wheels of a meter in such manner as to provide for a partial closing of the flow valve after the passage of a predetermined amount of fluid and for the subsequent full closing of the valve after a further predetermined amount of fluid flow.

In the present preferred embodiment of the invention the flow valve is a pressure controlled valve and the pressures for the control thereof are derived from the valve itself and are controlled by the pilot valve which is actuated from the counters of the meter. The structure and arrangement of the present apparatus is such that when the valve diaphragm is subjected to upstream pressure the valve will be closed and when the diaphragm is subjected to the lesser downstream pressure the valve will be fully open to permit maximum flow and when the diaphragm is subjected to an intermediate pressure the flow will be commensurately diminished. The pilot valve is arranged to selectively subject the valve diaphragm to these various pressures.

Figure 1:
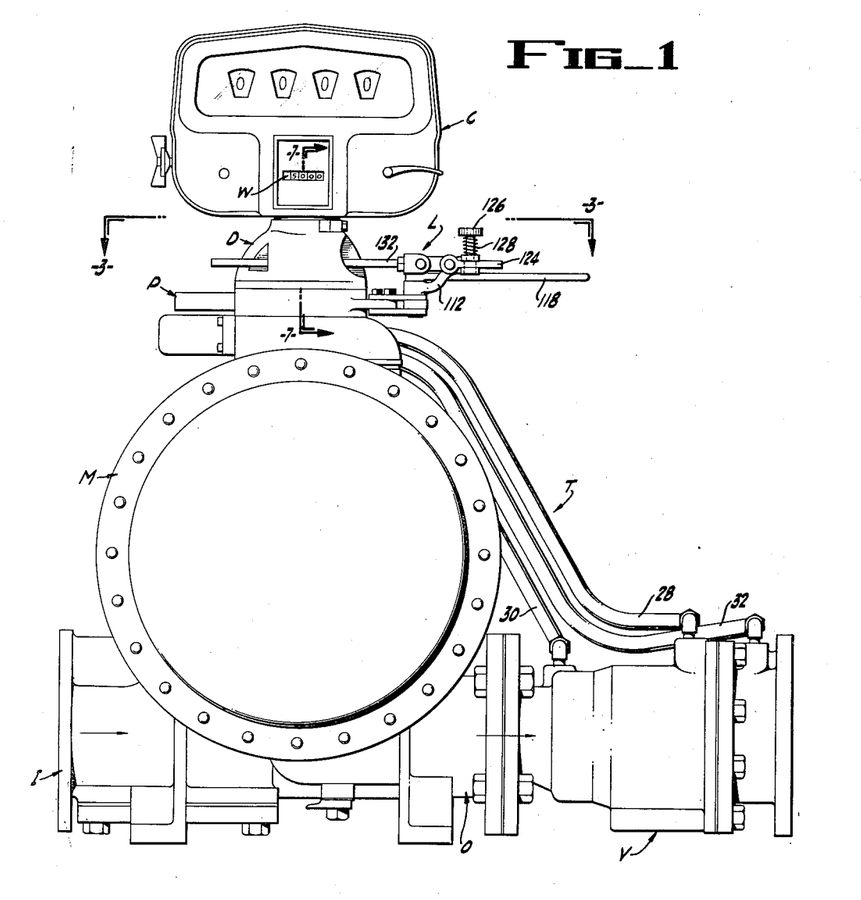
Figure 1 is a front elevation of one preferred form of the apparatus of the present invention.

Referring more particularly to Figure 1 of the drawing, it will be seen that the present preferred embodiment of the apparatus of the present invention includes a meter generally indicated by the letter M to which fluid is supplied from the intake coupling I and from which it is discharged through the outlet coupling O to which is secured the main flow valve V. The meter may be of any usual construction and is here disclosed as a conventional rotary type meter upon which is mounted a counter base D which supports a conventional type of counter indicated at C. It will of course be understood that as fluid passes through the meter the rotors thereof actuate the counter shaft which extends through the base D and into the counter C to provide for rotation of counter wheels indicated at W to an extent and at a rate commensurate with the passage of fluid through the meter. As indicated at P there is provided a pilot valve, the actuation of which is controlled by the counters through a latching and releasing mechanism generally indicated by the letter L. The pilot valve P controls the pressures for actuating the valve V through the means of tubes indicated at T. In further considering the present invention it may be borne in mind that neither the meter nor its counter, nor the specific valve V here indicated are of themselves the subject matter of the present invention, and various types of meters, counting mechanisms and valves may be substituted therefore without departing from the spirit or scope of the present invention.

Figure 2:
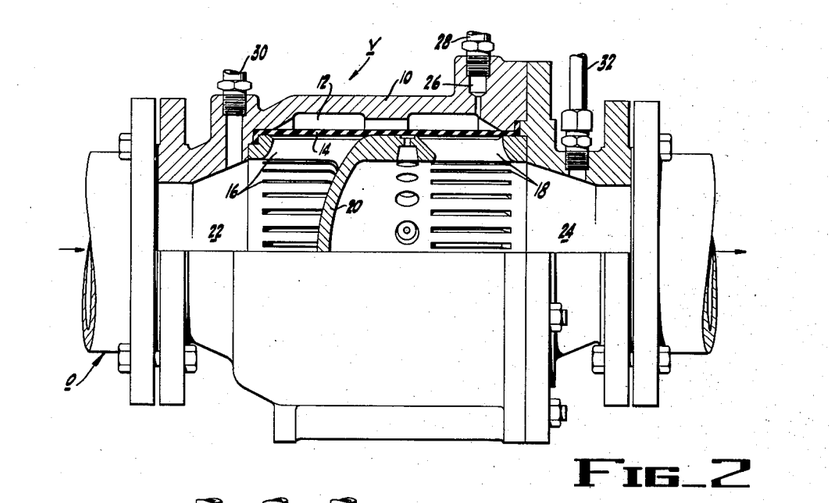
Figure 2 is a side elevation partly in section of the valve used in the apparatus disclosed in Figure 1.

The valve V of Figure 1 is illustrated in structural detail in Figure 2 and includes a valve casing 10 forming an external diaphragm chamber 12 annularly surrounding the cylindrical valve diaphragm 14 which diaphragm is formed of flexible material so as to be flexibly responsive to pressure variations between the valve chamber 12 and the internal fluid passageway. Within the diaphragm 14 there is provided a series of fluid inlet orifices 16 and at the opposite end a series of fluid outlet orifices indicated at 18 and therebetween there is provided a transverse valve seat 20 against the peripheral edge of which the diaphragm rests when valve is in closed position thus preventing flow of fluid between the orifices 16 and 18. Forwardly of the orifices 16 on the upstream side of the valve there is provided an upstream valve chamber 22 and beyond the orifices 18 at the opposite end of the valve there is provided a downstream valve chamber 24. For controlling the pressure in the chamber 12 which acts upon the external surface of the diaphragm 14 there is provided a duct 26 in the casing 10 which is connected with a tube 28 through which the controlling valve pressure is admitted. The actuating valve pressures are controlled through the pilot valve hereinafter to be described in detail. However, it may here be noted that the controlling pressures emanate from the upstream chamber 22 and the downstream chamber 24, such pressures being conducted to the pilot valve through the upstream pressure tube 30 and the downstream pressure tube 32.

Figure 3:
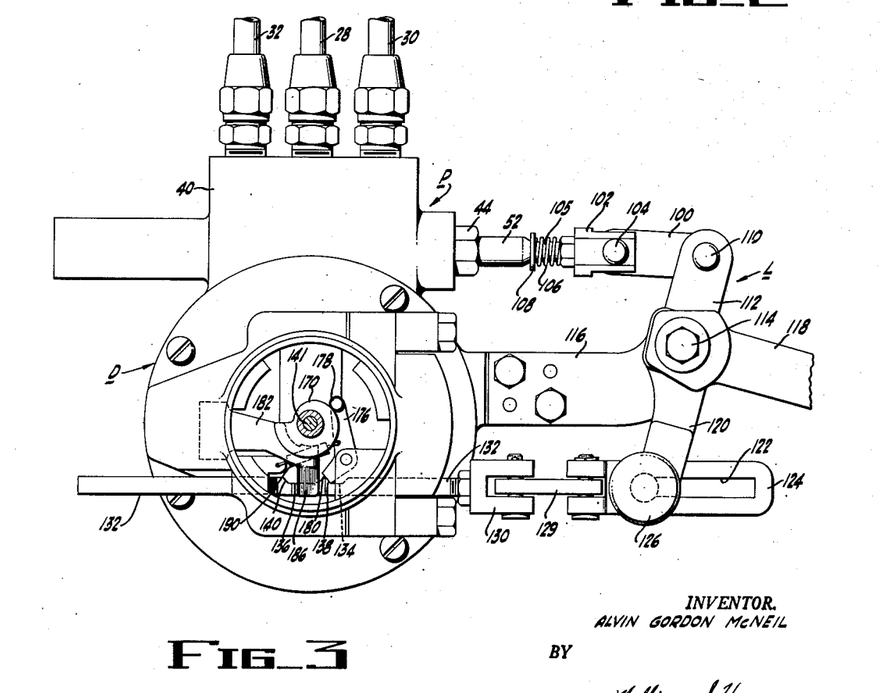
Figure 3 is a horizontal sectional view taken along line 3—3 of Figure 1, Figures 4, 5 and 6 are longitudinal sectional views of the pilot valve of the present invention showing the valve in various positions of operation.
Figure 4:
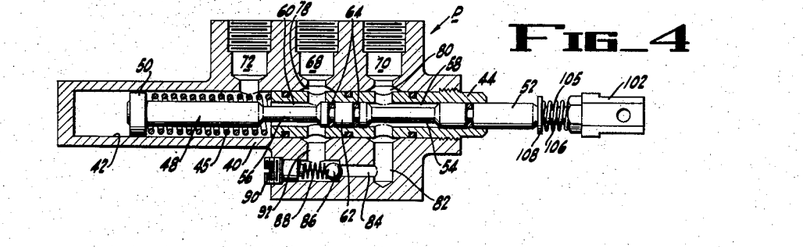
Figure 5:
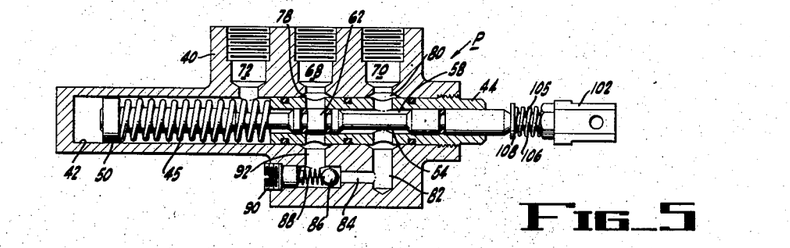
Figure 6:
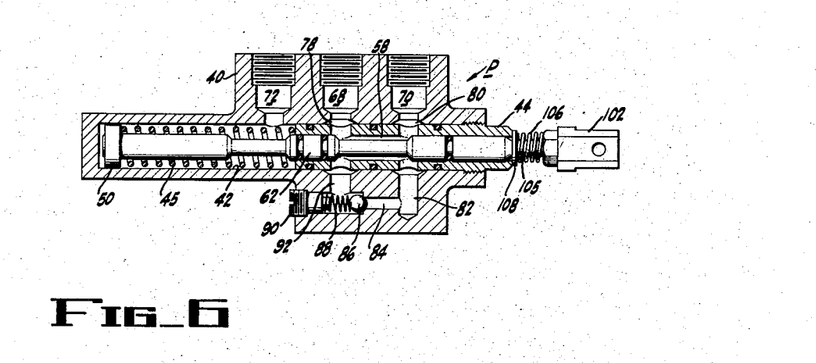

Referring now to Figures 4, 5 and 6, the pilot valve P as shown in Figure 1, will be seen to include an elongated valve body 40 having a longitudinal circular bore 42 within one end of which is mounted a stationary valve sleeve 44 while within the opposite end there is mounted a valve stem spring 46 surrounding the outer or left-hand end of the valve stem 48. The valve stem 48 includes a terminal end 50 against which the outer end of the spring 46 abuts while the inner end of the spring abuts the outer end of the valve sleeve 44. The inner end 52 of the valve stem is connected to suitable operating linkage hereinafter discussed and disclosed more particularly in Figure 3 and intermediate the ends of the valve stem there is provided a pair of spaced narrow stem portions 54 and 56 which provide fluid passageways 58 and 60. Between the stems 54 and 56 the valve is provided with a land 62 which is sealed on either side by suitable sealing means such as the O ring 64.

The valve casing 40 is provided with three ports 68, 70 and 72 which are adapted to receive the tubes 28, 30 and 32 respectively, which communicate with the diaphragm chamber, the upstream chamber and the downstream chamber of the main flow valve, respectively. The ports 68 and 70 lead to annular internal chambers 78 and 80 respectively, which surround the valve sleeve which sleeve is diametrically ported in communication with the chambers while the port 72 opens into the casing beyond the valve sleeve. The valve casing is also provided with a sub duct 82 and a longitudinal duct 84 which is normally blocked by a ball 86 of a check valve including spring 88 and an adjusting screw 90 and from the check valve there is a port 92 which leads to the annular space 78 so that the spaces 78 and 80 are always in communication past the check valve regardless of the position of the valve stem.

In the operation of the pilot valve the spring 46 normally urges the valve stem 48 to the left, while mechanism hereinafter to be discussed is provided by which the valve is moved to the right against the tension of the spring 46. With the valve in the position indicated in Figure 4 with the valve stem in fully extended right-hand position the diaphragm of the flow valve is under minimum pressure and a full flow of fluid therefore takes place through the valve. In this position, the central duct 68 which is connected by the tube 28 to the diaphragm chamber 12 of the flow valve is in communication by means of the passage 60 with the duct 72 which communicates with the tube 32 leading to the downstream chamber of the flow valve. It will be understood that the pressure in the downstream chamber of the flow valve is always less than the pressure in the upstream chamber of the flow valve and therefore with the diaphragm in communication with the downstream chamber by means of tubes 28 and 32 the diaphragm will be permitted to flex under the greater pressure of the upstream chamber and a full flow of fluid will pass through the valve. It will be noted that with the valve stem indicated in the position in Figure 4 fluid pressure from the upstream side of the valve through the tube 30 will pass through the duct 70 into the chamber 80 and thence into the sub duct 82 and the transverse passage 84 and may unseat the ball 86 of the pressure valve moving it against the tension of its spring 88 and permit such pressure to be effective on both of the ducts 68 and 72. However, since the ducts 68 and 72 are in communication with each other through the valve portion 60 such pressure will be relieved through the tube 32 leading to the downstream chamber and will not be effective as a pressure on the diaphragm.

When the valve stem is moved to a midway position, as indicated in Figure 5, the central land 62 of the valve stem blocks communication of the duct 68 with either of the ducts 70 and 72; however, as pointed out above, there is always communication between the chambers 78 and 80 by means of the ducts 82, 84 and 92 and past the check valve. In the position shown in Figure 5, while the land 62 precludes pressure from the downstream tube 32 to effect the diaphragm, there is communication past the check valve between the diaphragm and the upstream chamber by means of the tube 30, duct 70, chamber 80 and the sub-chamber leading past the check valve and to the chamber 78 and thence to the diaphragm through the tube 28. In this position it will be noted that although there is a pressure connection between the upstream chamber and the diaphragm, nevertheless this pressure is not of the full extent since the check valve is disposed in the path of pressure flow; hence, the diaphragm will be subjected to only a fraction of the total pressure of the upstream chamber and since the valve will flex open whenever the upstream pressure is greater than the diaphragm pressure the valve will be partly open under the conditions stated. It will of course be understood that by adjustment of the screw 90 of the check valve the degree to which the valve is open under conditions indicated in Figure 5 may be varied. In any event, however, the setting would be such as to substantially reduce the upflexing of the valve below that which takes place when the diaphragm pressure is only that of the downstream chamber.

With the valve moved to its full inner position, as indicated in Figure 6, pressure flow from the upstream chamber 22 through the tube 30 and to the duct 70 is delivered through the section 58 of the valve stem to pass directly to the duct 68 and thence by the tube 28 to the diaphragm, in which event the pressure is not subjected to the restraining effect of the check valve and thus the diaphragm is loaded with the full pressure of the upstream chamber 22 and the valve is therefore fully closed since the pressure on the outside of the diaphragm is at least equal to the pressure on the internal face of the diaphragm by means of the orifice 16. Thus, as shown in Figure 4, with the pilot valve in the position there indicated the flow valve will be fully open, while when the pilot valve is moved into the position indicated in Figure 5, the valve will be only partially open and when the pilot valve is in the position indicated in Figure 6, the flow valve will be completely closed.

Referring now more particularly to Figure 3 of the drawings, it will be seen that the valve stem 52 is engaged by and secured to a link 100 by means of a bifurcated connector 102 pivotally engaging a pin 104 carried by the link 100. It will also be noted that there is provided a reduced portion 105 at the outer end of the valve stem around which is mounted a coil spring 106 bearing against a loosely mounted washer 108 in such manner as to provide a cushioning at the end of the inward stroke of the valve stem under the influence of its spring 46, as indicated in Figure 6. The outer end of the link 100 is pivotally secured by a pivot pin 110 to one arm 112 of a T-shape handle operator which is pivotally mounted upon a bolt 114 to a rigidly secured bracket 116 extending outwardly from the counter base D. The handle shank, as indicated at 118, and arm 120 parallel with the arm 112 are releasably engaged within the slot 122 of a link 124 by means of a spring urged pin 126, the spring 128 of which normally retains the pin in engagement with the link 124. The inner end of the link 124 is joined by an intermediate link 129 with the bifurcated end 130 of a latch rod 132. The latch rod provided has on its upper surface a pair of latched recesses 134 and 136, the left-hand ends of which are formed with latch abutting shoulders 138 and 140 respectively. In the operation of the valve the shank 118 of the handle is moved downwardly in clockwise direction with respect to Figure 3 to initially move the pilot valve from the extreme left-hand position, indicated in Figure 6, to the extreme right-hand position, indicated in Figure 4. Such movement being against the tension of the spring 46 and means controlling the latch rod, then operate to retain the valve stem in the position indicated in Figure 4 until subsequently released through the medium of the counter as hereinafter described. As hereinbefore pointed out the pilot valve when in the position indicated at Figure 4 corresponding to the initial movement of the shank of the handle 118 causes the diaphragm to be in communication with the downstream side of the valve therefore permitting the valve to open fully and therefore such movement of the handle will open the valve to permit full flow of fluid.

Figures 7, 8, 9, 10, 11, 12:
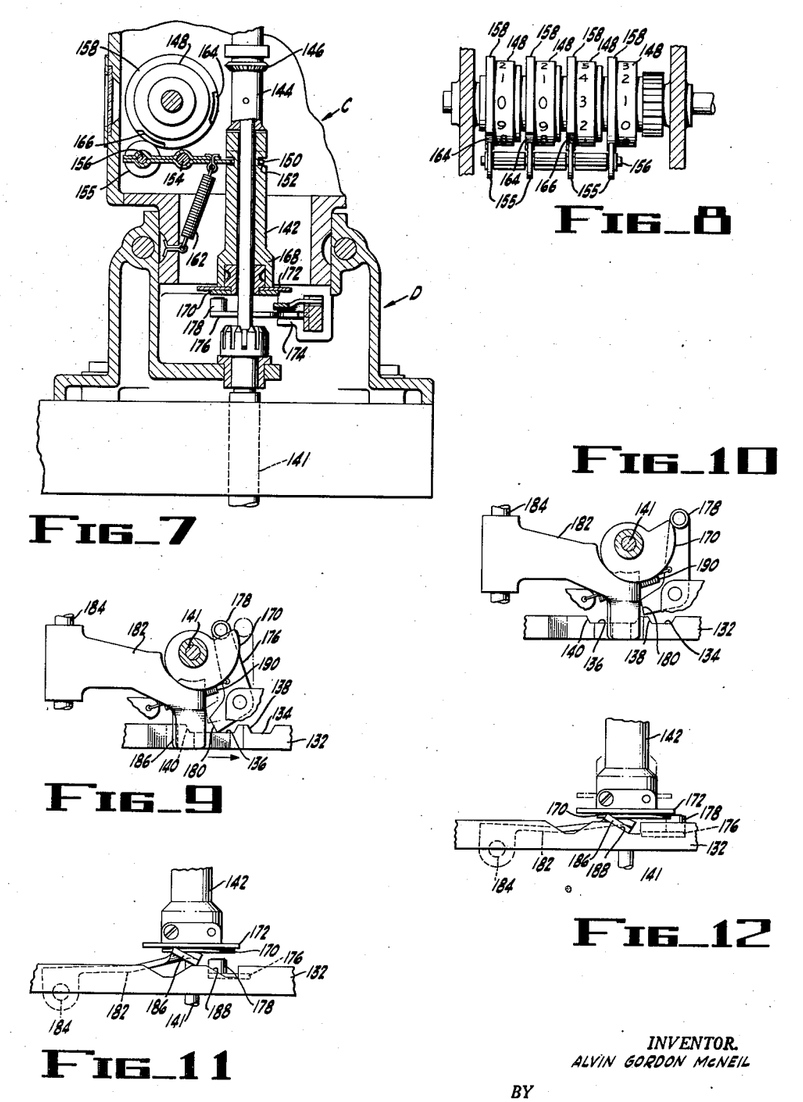
Figure 7 is a vertical sectional view taken along the line 7—7 of Figure 1.
Figure 8 is a detail view of the counter wheels of the meter of the present apparatus.
Figures 9 and 10 are detail views taken on the same section as illustrated in Figure 3, showing the cam lifting lever in two positions.
Figures 11 and 12 are side elevations of the lifting lever shown in the positions indicated by Figures 9 and 10, respectively.

Referring now to Figures 7 to 12, inclusive, the numeral 141 of Figure 7 indicates the drive shaft of the counter leading from the meter M, the upper end of which is reduced and has slidably mounted thereon for rotation therewith a cam spool 142, above the spool 142 the shaft 141 is united with a hub 144 which carries the gear 146 which rotates the counter wheels, indicated at 148 in Figures 7 and 8. Rotation of the cam spool 142 is provided by keying the spool to a spindle pinned to the upper portion of the shaft, as indicated. For controlling the bodily movement of the spool 142 upon the shaft 141 there is provided a lifting shoe, the inner furcated end 150 of which is seated within an annular groove 152 of the spool 142. The shoe is pivotally moved within the counter housing upon a pin 154 and the opposite end of the shoe is provided with a plurality of cam rollers 155 mounted on a transverse pin 156 and adapted to bear against the outer periphery of cams 158 carried by the counter wheels 148 in the manner indicated more clearly in Figure 8. A spring 162 is provided for normally urging the lifting shoe in clockwise direction with respect to Figure 7 and thus urging the cam rollers 155 against the cam faces of cams 158.

In the form of the invention here shown the counter mechanism is of the type which is actuated by the rotor shaft 141 to turn the wheels in a direction toward registration of the zeros thereof. In other words, the counter is operated in a reverse direction such that when 500 gallons of fluid are to be dispensed the counter is set to 500 and the rotation of the counter wheels is such as to diminish the number 500 until the zero point is reached. It will be understood, however, that the invention is applicable to various other types of counter mechanisms. Each of the cams 158 of the counter wheels, with the exception of one, is provided with a single cam notch similar to the notches indicated at 164 in Figure 7. One of the counter wheel cams 158, however, is provided with a second peripheral notch, indicated at 166 in Figure 7. The notches 164 of all of the cam wheels are located at the zero setting of such wheels or in such relation thereto as to provide for registration of the notches with the several rollers simultaneously when the zero setting of the counter wheels is reached. Thus, at the zero setting of such wheels all of the notches 164 will be in registration with all of the rollers 155 and the spring 162 will, therefore, cause the lifting shoe to move in a clockwise pivotal movement, as seen in Figure 7, so as to lower the spool 142 on the shaft 141 for the purpose hereinafter discussed. The one cam which is provided with a cam notch 166, as well as with the cam notch 164, is here shown as the second from the right and the notch may, for instance, be placed on the cam at a point where it will be in registration with its roller when the wheel is at the number 3 position. By this arrangement it will be seen that if 500 gallons are to be dispensed and if the counter is set to 500 and fluid passes through the meter the number will gradually diminish and thus the wheel furthest to the left, which represents thousand, not having been turned, stands at zero. For each 100 gallons dispensed the second wheel from the left will be moved one digit place until the last 100 gallons is reached, at which time this wheel also will stand at zero. Thereafter as the fluid continues to pass through the meter the wheel on the second to the right, indicating the tens of gallons will be revolved until the notch 166 thereof registers with its roller indicating that 460 gallons have passed through the meter. The second wheel will, of course, stand at this position until 10 more gallons have passed through the meter. During the passage of the next 10 gallons the first counter wheel on the right will move one digit for each gallon passed and will therefore have its notch in registration with its roller when it has reached the zero. Thus, it will be seen that with 30 gallons remaining to pass the meter the notches 164 of three of the counter wheels and the notch 166 of the second counter wheel will be in registration with the rollers 155 and thus at this point the spool 142 will be lowered in the manner aforesaid. In the manner hereinafter to be described the lowering of the spool 142 will change the pilot valve setting and cause the pilot valve to assume the intermediate position, indicated in Figure 5 of the drawings, and thus diminish the flow of fuel. It should be noted that as the flow continues at its diminished rate the first counter wheel will move its cam to force its roller 155 downwardly against the tension of the spring 156 and thus again raise the spool 142 and during the next passage of 10 gallons the second counter wheel will have moved from its number 3 position to a number 2 position and thus its notch 166 will again be out of registration with its roller and it will thus continue to keep the spool elevated while the first counter wheel makes the next two revolutions. Thereafter of course when the full predetermined quantity of fluid has passed the meter all of the wheels will be at their zero position and the notches 164 will all be in registration with their respective rollers and the spool will again be lowered and it will retain its lowered position until the counter is again set for the next successive discharge of fluid. In this connection it will be noted that the length of the notch 166 is such as to permit only a single rotation of the spool 142 in its lowermost position.

Referring now more particularly to Figures 3, 9, 10, 11 and 12, it will be seen that the spool 142 is provided at its lower end with a head 168 under which there is provided a spiral cam surface 170 and with an outstanding flange 172 thereover. Mounted upon a bracket 174 within the counter base D there is provided a latch trigger 176 in the form of a bell crank, one arm of which carries a cam engaging roller 178, while the other arm terminates in a latch face 180 which is in the path of movement of the latch shoulders 138 and 140 of the latch rod 132. As will be seen more clearly in Figure 3, during the normal passage of fluid the latch arm will be on the inner lower surface of the cam 170 and the latch face 180 will be in engagement with the latch shoulder 138 of the latch rod. Thus the rod will be retained in its furthest left-hand position, as indicated, and thus retain the pilot valve in the position indicated in Figure 5 with the stem thereof in its furthest right-hand position. When the spool 142 is lowered for the first time at the expiration of something less than the full quantity of fluid the spool is lowered and the cam thereof is brought by such lowering into the plane of the roller 178 of the latch trigger 176, and thus as the cam rotates the latch will be pivotally moved outwardly to the position indicated in Figure 10. As the latch is moved outwardly it will be seen that the latching face 180 is lifted from the latch shoulder 138 and thus the latching rod is permitted to move to the right under the influence of the spring 46 of the pilot valve and in so moving the pilot valve stem will be shifted to the intermediate position indicated in Figure 5 of the drawings and thus the upstream pressure of the main flow valve will be connected to the diaphragm through the check valve and thus there will be a diminution of the flow appropriate for the setting of the check valve.

Since the movement of the latch rod is quite rapid by the tension applied thereto by the spring of the pilot valve and since there may be some delay in the lifting of the spool 142 it is desirable to provide means by which the latch arm is quickly released from the cam after the latch shoulder 138 is first freed by the latch. Therefore there is provided a cam lifting arm 182 pivotally mounted as indicated at 184 in a horizontal plane and extends inward from such pivotal mounting to lie beneath the plate 172 of the cam 170, the arm 182 is provided with an angularly turned sidewardly extending operating finger 186 which lies over the latch rod and which rests within the notch 188 on the upper face of the latch rod as seen in Figure 12. This arrangement is such that as the latch rod begins to move after release of the shoulder 138 the camming surface at the end of the notch 188 will move the lifting mechanism upwardly whereby its upper surface under the plate 172 will immediately raise the cam to release the latch permitting it to return to its full inward position under the influence of the spring 190 so as to be immediately in position to engage the shoulder 140 thus retaining the latch in the intermediate position where it is held until the zero reading of the wheels again lowers the spool 142 and again causing its cam to engage the roller and to move it in clockwise direction so as to release the surface 140 and thus permit the valve to move to the fully closed position as indicated in Figure 6 of the drawings.

From the foregoing it will be seen that in the operation of the device initial manual movement of the operating handle will set the pilot valve in the position indicated in Figure 4 as supplying downstream pressure to the diaphragm of the flow valve and thus permitting a full rate of flow of fluid, the pilot valve being retained in this position by the engagement of the latching trigger with the first notch of the latching rod. Thereafter when a predetermined but not total amount of fluid has passed the meter and at such time when all but one of the counter wheels are in zero position and the other one which has a second notch therein has such second notch in registration with its roller the spool will be lowered, the cam will engage the roller to release the latch trigger from engagement with the first shoulder of the latching rod to permit the valve to move to its second position, it being restrained in that position by the engagement of the latch trigger with the second shoulder of the latching rod, it being understood that with the initial movement of the latching rod the lifting mechanism will have been cammed in such manner as to lift the cam and the spool out of registration with the latch roller. Thus, the pilot valve will assume the position indicated in Figure 5 at which time the upstream pressure is supplied through the check valve of the pilot valve to the diaphragm of the flow valve and such pressure as limited by the check valve will be effective to move the diaphragm towards the member 20 and thus materially diminish the flow until such time as the final predetermined amount of fluid has passed the meter. As hereinbefore described as the counter wheels all reach the zero setting their notches will register with their rollers, the spool will again be lowered registering its cam with the latch roller and again moving the latch trigger to release the second notch to permit the pilot stem to move to its further left position under the influence of the spring and thus subjecting the diaphragm to the full upstream pressure whereby the diaphragm will be fully seated against the valve seat 29 of the valve completely terminating the flow of fluid.

From the foregoing it will be seen that the present invention provides a novel and ingenious means by which flow of fluid may be retarded prior to the complete cessation of flow and by such retarding a gradual diminishment of the flow will ensue so as to preclude shock to the associated apparatus. The apparatus is therefore effective in carrying out the system of the present invention which provides for the discharge of fluid in successive stages of rate of flow.

While the apparatus of the present invention discloses one preferred embodiment thereof, it will be understood that the invention is not limited to the specific structural details here shown and that numerous changes and modifications and the full use of equivalents may be resorted to in the practice of the invention without departing from the spirit and scope thereof, as outlined in the appended claims.

Having thus described my invention, what I claim and desire to secure by Letters Patent is:

1. A device of the class described, comprising a valve adapted to be moved from an open position, step-by-step, to a closed position, control means for controlling movement of the valve, including a latch member urged in one direction and adapted to move in step-by-step fashion in said one direction, means for progressively closing the valve in accordance with step-by-step movement of the latch member, a latch urged into engagement with the latch member, and adapted to be successively tripped and operable to successively latch the latch member to allow step-by-step advancement of the latch member, means operable for periodically engaging and tripping the latch to allow step-by-step movement of the latch member, and means operable independently of the last named means for inactivating the tripping action of the last named means immediately after tripping thereof to release the latch for immediate re-engagement with the latch member.

2. A device of the class described, comprising a valve adapted to be moved from an open position, step-by-step, to a closed position, control means for controlling movement of the valve, including a latch member urged in one direction and adapted to move in step-by-step fashion in said one direction, means for progressively closing the valve in accordance with step-by-step movement of the latch member, a latch urged into engagement with the latch member, and adapted to be successively tripped and operable to successively latch the latch member to allow step-by-step advancement of the latch member, cam means operable for periodically engaging and tripping the latch to allow step-by-step movement of the latch member, and cam means operable independently of the last named means for inactivating the tripping action of the last named means immediately after tripping thereof to release the latch for immediate re-engagement with the latch member.

3. A device of the class described, comprising a valve adapted to be moved from an open position, step-by-step, to a closed position, control means for controlling movement of the valve, including a latch member urged in one direction and adapted to move in step-by-step fashion in said one direction, means for progressively closing the valve in accordance with step-by-step movement of the latch member, a latch urged into engagement with the latch member, and adapted to be successively tripped and operable to successively latch the latch member to allow step-by-step advancement of the latch member, means operable for periodically engaging and tripping the latch to allow step-by-step movement of the latch member, and means responsive to movement of the latch member for inactivating the tripping action of the last named means immediately after tripping of the latch, to release the latch for immediate re-engagement with the latch member.

4. A device of the class described, comprising a valve adapted to be moved from an open position, step-by-step, to a closed position, control means for controlling movement of the valve, including a latch member urged in one direction and adapted to move in step-by-step fashion in said one direction, means for progressively closing the valve in accordance with step-by-step movement of the latch member, a latch urged into engagement with the latch member, and adapted to be successively tripped and operable to successively latch the latch member to allow step-by-step advancement of the latch member, means operable for periodically engaging and tripping the latch to allow step-by-step movement of the latch member, and means operated by movement of the latch member for inactivating the tripping action of the last named means immediately after tripping of the latch to release the latch for immediate re-engagement with the latch member.

5. A device of the class described, comprising a valve adapted to be moved from an open position, step-by-step, to a closed position, control means for controlling movement of the valve, including a latch member urged in one direction and adapted to move in step-by-step fashion in said one direction, means for progressively closing the valve in accordance with step-by-step movement of the latch member, a latch urged into engagement with the latch member, and adapted to be successively tripped and operable to successively latch the latch member to allow step-by-step advancement of the latch member, means operable for periodically engaging and tripping the latch to allow step-by-step movement of the latch member, and a cam pivoted for movement about a bodily stationary axis and operated by movement of the latch member for inactivating the tripping action of the last named means immediately after tripping of the latch to release the latch for immediate re-engagement with the latch member.

6. A device of the class described, comprising a valve adapted to be moved from an open position, step-by-step, to a closed position, control means for controlling movement of the valve, including a latch member urged in one direction and adapted to move in step-by-step fashion in said one direction, means for progressively closing the valve in accordance with step-by-step movement of the latch member, a latch urged into engagement with the latch member, and adapted to be successively tripped and operable to successively latch the latch member to allow step-by-step advancement of the latch member, a cam for tripping the latch, movable from an inoperative to an operative position, fluid motor means arranged to be driven by the fluid passing through the valve, means operated by the fluid motor means for periodically bodily moving the cam to its operative position to trip the latch, and means operable independently of the last named means for immediately moving the cam back to its inoperative position after tripping of the latch to release the latch for immediate re-engagement with the latch member.

7. A device of the class described, comprising a valve adapted to be moved from an open position, step-by-step, to a closed position, control means for controlling movement of the valve, including a latch member urged in one direction and adapted to move in step-by-step fashion in said one direction, means for progressively closing the valve in accordance with step-by-step movement of the latch member, a latch urged into engagement with the latch member, and adapted to be successively tripped and operable to successively latch the latch member to allow step-by-step advancement of the latch member, a cam for tripping the latch, movable from an inoperative to an operative position, fluid motor means arranged to be driven by the fluid passing through the valve, means operated by the fluid motor means for periodically bodily moving the cam to its operative position to trip the latch, and means responsive to movement of the latch member for immediately moving the cam back to its inoperative position after tripping of the latch, to release the latch for immediate re-engagement with the latch member.

8. A device of the class described, comprising a valve adapted to be moved from an open position, step-by-step, to a closed position, control means for controlling movement of the valve, including a latch member urged in one direction and adapted to move in step-by-step fashion in said one direction, means for progressively closing the valve in accordance with step-by-step movement of the latch member, a latch urged into engagement with the latch member, and adapted to be successively tripped and operable to successively latch the latch member to allow step-by-step advancement of the latch member, a cam for tripping the latch, movable from an inoperative to an operative position, fluid motor means arranged to be driven by the fluid passing through the valve, means operated by the fluid motor means for periodically bodily moving the cam to its operative position to trip the latch, and means operated by movement of the latch member for immediately moving the cam bodily back to its inoperative position after tripping of the latch to release the latch for immediate re-engagement with the latch member.

9. A device of the class described, comprising a valve adapted to be moved from an open position, step-by-step, to a closed position, control means for controlling movement of the valve, including a latch member urged in one direction and adapted to move in step-by-step fashion in said one direction, means for progressively closing the valve in accordance with step-by-step movement of the latch member, a latch urged into engagement with the latch member, and adapted to be successively tripped and operable to successively latch the latch member to allow step-by-step advancement of the latch member, a rotary cam for tripping the latch, bodily movable from an inoperative position to an operative position, fluid motor means for rotating the cam and being arranged to be driven by the fluid passing through the valve, means operated by the fluid motor means for periodically bodily moving the cam to its operative position for tripping the latch, and means operable independently of the last named means for immediately moving the rotary cam back to its inoperative position after tripping of the latch to release the latch for immediate re-engagement with the latch member.

10. A device of the class described, comprising a valve adapted to be moved from an open position, step-by-step, to a closed position, control means for controlling movement of the valve, including a latch member urged in one direction and adapted to move in step-by-step fashion in said one direction, means for progressively closing the valve in accordance with step-by-step movement of the latch member, a latch urged into engagement with the latch member, and adapted to be successively tripped and operable to successively latch the latch member to allow step-by-step advancement of the latch member, a rotary cam for tripping the latch, bodily movable from an inoperative position to an operative position, fluid motor means for rotating the cam and being arranged to be driven by the fluid passing through the valve, means operated by the fluid motor means for periodically bodily moving the cam to its operative position for tripping the latch, and means responsive to movement of the latch member for immediately bodily moving the rotary cam back to its inoperative position after tripping of the latch, to release the latch for immediate re-engagement with the latch member.

11. A device of the class described, comprising a valve adapted to be moved from an open position, step-by-step, to a closed position, control means for controlling movement of the valve, including a latch member urged in one direction and adapted to move in step-by-step fashion in said one direction, means for progressively closing the valve in accordance with step-by-step movement of the latch member, a latch urged into engagement with the latch member, and adapted to be successively tripped and operable to successively latch the latch member to allow step-by-step advancement of the latch member, a rotary cam for tripping the latch, bodily movable from an inoperative position to an operative position, fluid motor means for rotating the cam and being arranged to be driven by the fluid passing through the valve, means operated by the fluid motor means for periodically bodily moving the cam to its operative position for tripping the latch, and means operated by the latch member for bodily moving the rotary cam back to its inoperative position immediately after tripping of the latch to release the latch for immediate re-engagement with the latch member.

12. A device of the class described, comprising a valve adapted to be moved from an open position, step-by-step, to a closed position, control means for controlling movement of the valve, including a latch member urged in one direction and adapted to move in step-by-step fashion in said one direction, means for progressively closing the valve in accordance with step-by-step movement of the latch member, a latch urged into engagement with the latch member, and adapted to be successively tripped and operable to successively latch the latch member to allow step-by-step advancement of the latch member, a rotary cam for tripping the latch, bodily movable from an inoperative position to an operative position, fluid motor means for rotating the cam and being arranged to be driven by the fluid passing through the valve, means operated by the fluid motor means for periodically bodily moving the cam to its operative position for tripping the latch, and a cam mounted for pivotal movement about a bodily stationary axis, operated by movement of the latch member for moving the rotary cam back to its inoperative position immediately after tripping of the latch, to release the latch for immediate re-engagement with the latch member.

ALVIN GORDON McNEIL.

REFERENCES CITED

The following references are of record in the file of this patent:

UNITED STATES PATENTS

| Number | Name | Date |
| --- | --- | --- |
| 1,919,828 | Crosby | July 25, 1933 |
| 2,057,333 | Guibert | Oct. 13, 1936 |
| 2,302,529 | Cornell et al. | Nov. 17, 1942 |